(12) United States Patent
Marcin et al.

(10) Patent No.: US 10,099,104 B2
(45) Date of Patent: Oct. 16, 2018

(54) ATTACHMENT FOR A SPORT TRAINING DEVICE

(71) Applicants: John Charles Marcin, Huntington Beach, CA (US); Robert Henri Schenkkan, Corona, CA (US)

(72) Inventors: John Charles Marcin, Huntington Beach, CA (US); Robert Henri Schenkkan, Corona, CA (US)

(73) Assignee: ROJO SPORT INC, Huntington Beach, CA (US)

(*) Notice: Subject to any disclaimer, the term of this patent is extended or adjusted under 35 U.S.C. 154(b) by 0 days.

(21) Appl. No.: 15/599,854

(22) Filed: May 19, 2017

(65) Prior Publication Data
US 2017/0252619 A1    Sep. 7, 2017

Related U.S. Application Data

(60) Division of application No. 14/838,625, filed on Aug. 28, 2015, now Pat. No. 9,694,266, which is a continuation-in-part of application No. 14/229,993, filed on Mar. 31, 2014.

(51) Int. Cl.
*A63B 69/00* (2006.01)
*A63B 63/00* (2006.01)
(Continued)

(52) U.S. Cl.
CPC .......... *A63B 63/003* (2013.01); *A63B 63/004* (2013.01); *A63B 69/002* (2013.01); *F16M 13/022* (2013.01); *A63B 69/0024* (2013.01); *A63B 69/0026* (2013.01); *A63B 2071/0694* (2013.01); *Y10T 29/49764* (2015.01); *Y10T 29/49826* (2015.01)

(58) Field of Classification Search
CPC . A63B 63/00; A63B 63/004; A63B 2063/002; A63B 69/0026; A63B 69/002; A63B 2024/005; A63B 2024/0046; A63B 69/0002; A63B 2102/24
USPC ................. 273/398–402; 473/446, 454, 462; 248/125.7, 218.4, 219.1, 219.4, 229.17, 248/227.3, 228.8, 230.8, 230.9
See application file for complete search history.

(56) References Cited

U.S. PATENT DOCUMENTS

3,197,208 A * 7/1965 Makar .................... A63B 63/00
                                                              473/190
3,328,033 A * 6/1967 Hendry .................. A63B 63/00
                                                              248/328

(Continued)

*Primary Examiner* — Mark Graham
(74) *Attorney, Agent, or Firm* — SY Consultants; Pamela Lau Kee

(57) ABSTRACT

A sports training device includes a target having a mounting arm and an attachment. The mounting arm includes a set of front holes and a set of back holes. The hole sets are separated by at least a quarter of the circumference of an in situ support. The attachment includes a strap, hook, and tab. The first and the second ends of a strap are threaded through the front hole set thus forming a loop and then threaded through the back hole set. The strap ends are threaded through the holes on the tab. A hook is positioned on the loop. The tab includes a hole for the hook and two pair of tab holes for the strap. The first end is threaded through the first pair of tab holes while the second end is threaded through the second pair of tab holes.

8 Claims, 5 Drawing Sheets

(51) Int. Cl.
 *F16M 13/02* (2006.01)
 *A63B 71/06* (2006.01)

(56) References Cited

U.S. PATENT DOCUMENTS

| | | | | |
|---|---|---|---|---|
| 3,856,298 A * | 12/1974 | Frantti | | A63B 63/00 |
| | | | | 273/127 R |
| 4,245,843 A * | 1/1981 | Griggs | | A63B 63/00 |
| | | | | 273/380 |
| 4,842,283 A * | 6/1989 | LeBel | | A63B 63/004 |
| | | | | 273/392 |
| 5,271,624 A * | 12/1993 | Sciortino | | A63B 63/004 |
| | | | | 473/446 |
| 5,281,191 A * | 1/1994 | DeSousa | | A63B 69/34 |
| | | | | 473/442 |
| 5,634,640 A * | 6/1997 | McCarrel | | A63B 63/00 |
| | | | | 273/127 B |
| 5,673,889 A * | 10/1997 | DeValcourt | | B60R 9/08 |
| | | | | 224/319 |
| 5,944,318 A * | 8/1999 | Payton | | A63B 63/00 |
| | | | | 273/402 |
| 6,065,722 A * | 5/2000 | LeVasseur | | F21V 21/08 |
| | | | | 248/218.4 |
| 6,402,641 B1 * | 6/2002 | Lee | | A63B 63/00 |
| | | | | 273/127 R |
| 6,581,891 B1 * | 6/2003 | Byrd | | A01K 31/14 |
| | | | | 248/218.4 |
| 6,588,440 B2 * | 7/2003 | Varnado | | A01M 31/025 |
| | | | | 135/120.1 |
| 7,134,976 B1 * | 11/2006 | Smith | | A63B 24/0021 |
| | | | | 473/446 |
| 7,661,679 B2 * | 2/2010 | Mah | | A63B 63/004 |
| | | | | 273/371 |
| 7,959,528 B1 * | 6/2011 | Wilkes | | A63B 69/0002 |
| | | | | 473/451 |
| 8,052,545 B1 * | 11/2011 | Assenheimer, III | | |
| | | | | A63B 63/003 |
| | | | | 473/422 |
| 8,087,195 B2 * | 1/2012 | Minges | | A01M 31/02 |
| | | | | 248/230.8 |
| 9,694,266 B2 * | 7/2017 | Marcin | | A63B 63/003 |
| 2003/0199342 A1 * | 10/2003 | Birss | | A63B 63/004 |
| | | | | 473/446 |
| 2007/0265115 A1 * | 11/2007 | Farquhar | | A63B 63/004 |
| | | | | 473/446 |
| 2009/0134581 A1 * | 5/2009 | Box | | F41J 3/0004 |
| | | | | 273/403 |
| 2015/0069706 A1 * | 3/2015 | Fodera | | F41J 1/10 |
| | | | | 273/380 |
| 2015/0323126 A1 * | 11/2015 | Edgington | | A01G 13/00 |
| | | | | 248/229.17 |

* cited by examiner

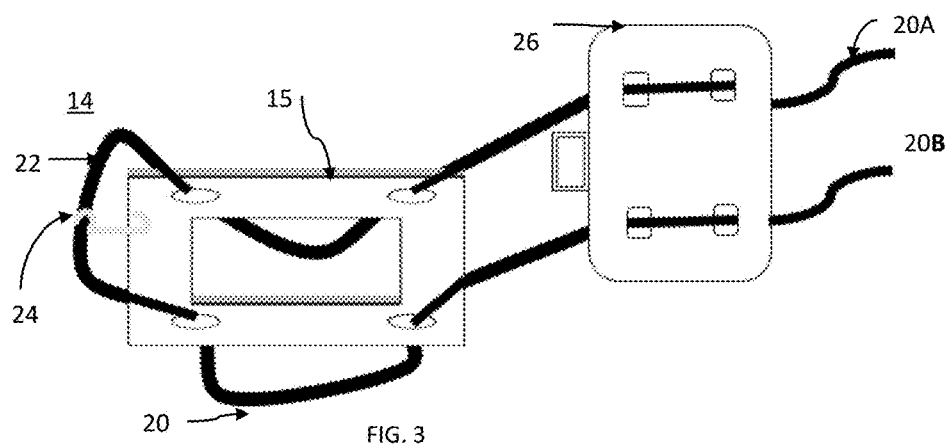
FIG. 3
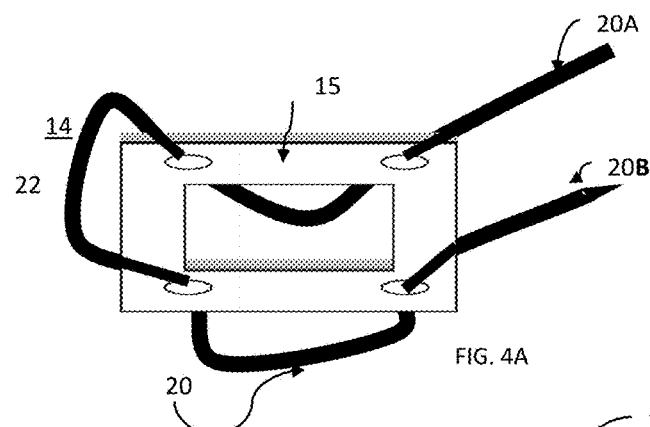
FIG. 4A
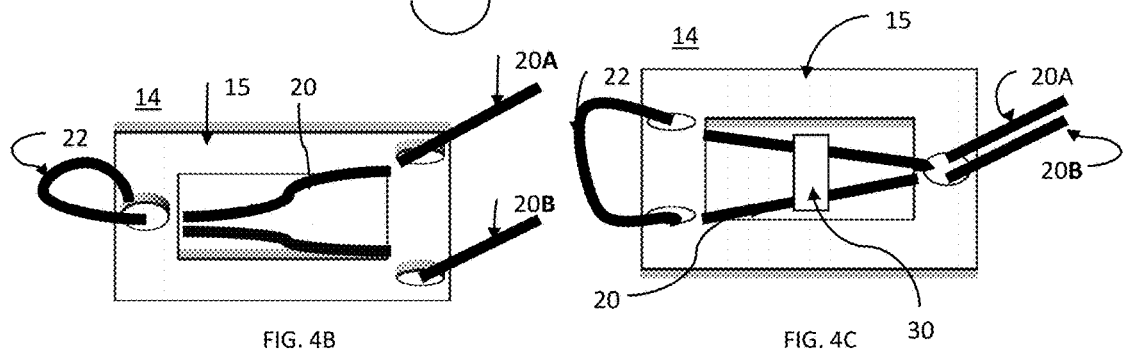
FIG. 4B
FIG. 4C

24

24

26

ATTACHMENT FOR A SPORT TRAINING DEVICE

CROSS-REFERENCE TO RELATED APPLICATIONS

This application is a divisional of U.S. patent application Ser. No. 14/838,625, "Attachment for a Sport Training Device", filed 28 Aug. 2015, which is a continuation-in-part of U.S. patent application Ser. No. 14/229,993, "Sports Training Device", filed Mar. 31, 2014, "Sports Training Device".

FIELD

The present invention relates generally to a sports training device. In particular, it relates to an attachment which can attach a target at a variety of locations, and methods related thereto.

BACKGROUND

In many sports, a player needs to accurately throw, kick, hit, or shoot a projectile to a specific location in a goal. To illustrate, in soccer, there are locations in a goal that are very difficult for the goalie to defend, e.g. upper corners of the goal. During practice, players drill to improve their accuracy by aiming at a physical practice target. The target visually focuses their attention to the point of interest. The physical practice targets are removable as they are not used in actual game play. The practice target is transported to the practice site and attached to the goal in one or more positions during a drill. The target may be reattached during the session to practice aiming at different locations in the goal.

SUMMARY

A sports training device for attaching to an in situ support includes a target having a mounting arm and an attachment. The mounting arm includes a set of front holes and a set of back holes. For each, set there is at least one member. The sets of front and back holes are separated by a minimum of quarter of the circumference of the in situ support. The attachment includes a strap, hook, and tab. The first and the second ends of a strap are threaded through the set of front holes thus forming a loop and then threaded through the set of back holes. The strap ends are further threaded through the holes on the tab. A hook is positioned on the loop. The tab includes a hole for the hook and two pair of tab holes for the strap. The first pair of tab holes is positioned proximate the upper edge of the tab while the second pair of holes is positioned proximate the lower edge of the tab. The first end is further threaded through the first pair of tab holes while the second end is threaded through the second pair of tab holes. In operation, the mounting arm is secured by encircling the in situ support and positioning the hook in the hole of the tab. The straps are pulled to apply 10-100 lbs of tension to promote position stability when mounted on the goalpost.

BRIEF DESCRIPTION OF THE DRAWINGS

In FIG. 2A, the mounting arm includes a front hole and a back hole. FIG. 2B-D, the mounting arm includes a front pair of slots and a back pair of slots. In FIG. 2E, there is a front pair of slots and a single back hole. In FIG. 2F, there is a single front hole and a back pair of slots. In FIG. 2G, there is a front pair of slots and two back pairs of slots.

FIG. 3 is a plan view of the mounting arm and attachment shown in FIG. 1.

FIG. 4A shows the strap threaded through the mounting arm of FIG. 2B. FIG. 4B shows the strap threaded through the mounting arm of FIG. 2E. FIG. 4C shows the strap threaded through the mounting arm of FIG. 2F.

In FIG. 5B, the hook includes a rectangular tube.

DETAILED DESCRIPTION

The present invention relates to a sports training device. More specifically, it relates to a portable and practice target device that may be attached to an in situ support at a variety of locations to enable an individual to independently practice and improve throwing, kicking, or shooting accuracy of projectiles.

The attachment disclosed is not limited to mounting to a sports goal, nor is it limited for use during practice. The attachment can also be mounted to any designated location such as a pole, which may be horizontal, vertical or angled, where a person wishes to mark for aim such as in Frisbee golf or a game of horse.

The attachment allows a sports training device to be carried to a practice location, attached and used, then removed and carried away at the end of the practice session. The sports training device may be small in size and weight for portability and also easily and quickly attachable and removable from various portions of the goal to facilitate ease and range of use.

Figure 1:
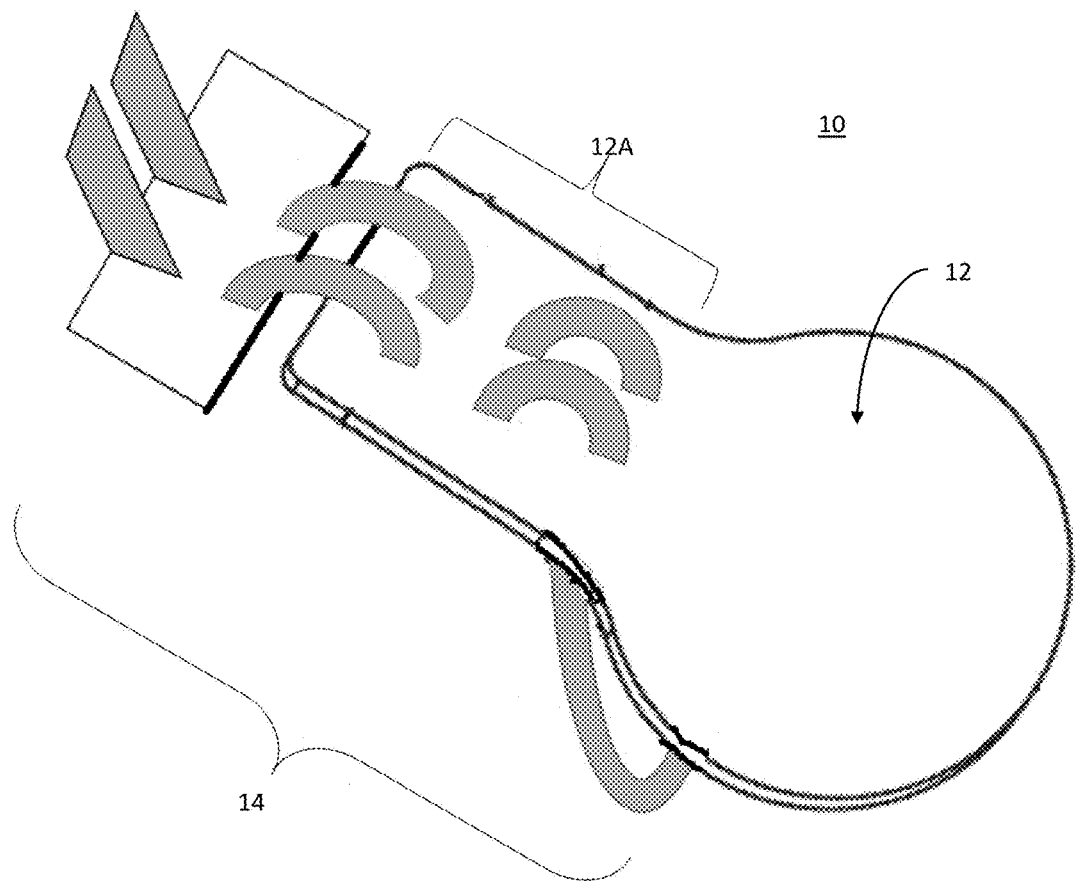
FIG. 1 is a bottom view of a sports training device configured for securing to an in situ support, e.g. backyard goalpost.

FIG. 1 is a bottom view for a sports training device 10 for securing to an in situ support, e.g. backyard goalpost. The device 10 includes a target 12 having a mounting arm 12A and an attachment 14. In combination, the mounting arm 12A and the attachment 14 form a mounting attachment.

Figure 2A:
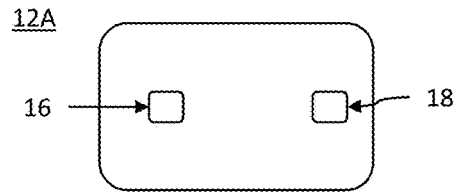
FIGS. 2A-G illustrate the mounting arm 12A of the target 12 shown in FIG. 1.
Figure 2B:
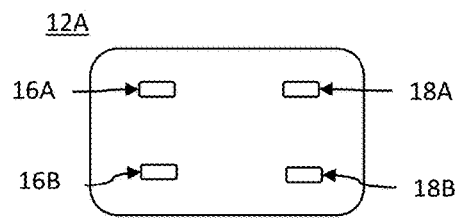
Figure 2C:
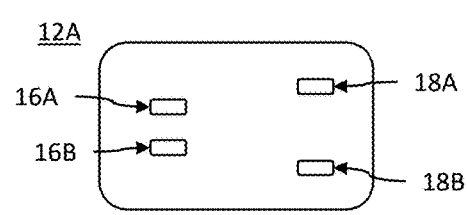
Figure 2D:
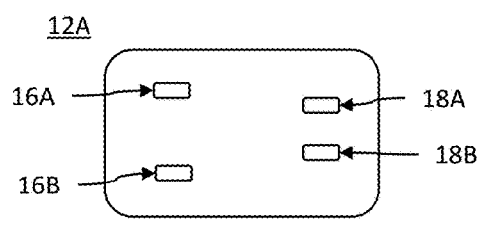
Figure 2E:
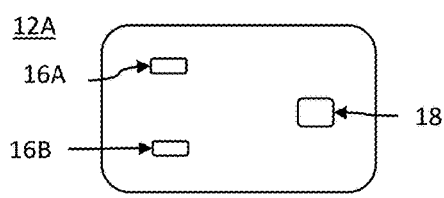
Figure 2F:
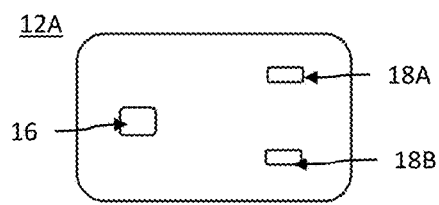
Figure 2G:
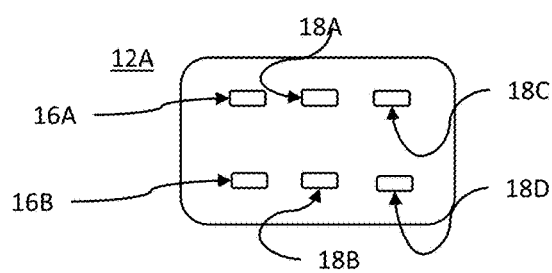

FIGS. 2A-2G illustrate the mounting arm 12A of the target 12 shown in FIG. 1. The front of the mounting arm 12A is positioned proximate the target 12 while the back of the mounting arm 12A is the distal end. In FIG. 2A, the mounting arm 12A includes a front hole 16 and a back hole 18. In FIG. 2B, the mounting arm includes a front pair of slots 16A, 16B and a back pair of slots 18A, 18B. The distance between the slots of the front pair and the slots of the back pair are similar. In FIGS. 2C and 2D, the mounting arm includes a front pair of slots 16A, 16B and a back pair of slots 18A, 18B. The distance between the slots of the front pair and the slots of the back pair are dissimilar. In FIG. 2C, the front pair are closer than the back pair. In FIG. 2D, the front pair are further apart than the back pair. In FIG. 2E, there is a front pair of slots 16A, 16B and a single back hole 18. In FIG. 2F, there is a single front hole 16 and a back pair of slots 18A, 18B. In FIG. 2G, there is a front pair of slots 16A, 16B and at least two back pairs of slots 18A, 18B, 18C, 18D. This embodiment is adjustable to accommodate a variety of goal post circumferences.

For added stability, the front openings and the back openings are separated by a minimum of quarter of the circumference of the in situ support. For a regulation water polo goal post, the minimum distance is 3 inches.

The slots or holes do not all have to be the same shape. The slots have a width comparable to the outer diameter of the strap 20.

The mounting arm may be primarily made of an elastomer. An elastomer is defined as a polymer which can reversibly extend 5-700%.

The measure of hardness, and resistance to deformation (elastic modulus) for elastic polymer can be quantified by the Shore durometer or durometer reading. The term refers to the measurement as well as the instrument itself. Durometer A and Durometer D are different scales for targeting elastomers for different uses. A larger force is applied during a measurement of Durometer D compared to Durometer A, thus Durometer D scale values indicate more resistant or harder material for the same reading as Durometer A. Within each scale, a larger number indicates harder or more resistant material.

Elastomers with a Durometer A readings of approximately 80 A to 120 A or a Durometer D reading of 35 D to 70 D are suitable for the mounting arm. Some examples of elastomers with durometers within this range include polyurethane, latex (natural or synthetitc rubber emulsion), natural rubber, polychloroprene, e.g. Neoprene®, EPDM rubber (ethylene proplylene diene monomer (M-class) rubber), synthetic rubber, and fluoropolymer elastomers such as Viton®, and TPE (thermal plastic elastomers) such as Santoprene®. The elastomer may be a solid film, molded foam or other.

The mounting arm may be made from material similar to that of the target, e.g. polyurethane laminate PUL. To improve stability after positioning, the mounting arm may be coated with a contact adhesive or a laminating PUL. In another variation, the mounting arm may be textured to increase the friction when the goal post has a rough surface. At least one hole may be positioned within the mounting arm to remove material to reduce weight and improve flexibility. Polyurethane has a durometer A reading of 100 A at a thickness of 3.0 mm. The durometer and thickness is chosen based on the projected weight of the target 12 at a given diameter.

The mounting arm may be produced from a sheet of elastomeric material by molding, cutting, punching, or stamping. The mounting arm may have additional designs, logos, advertisement, drawings, etc. on its surface or material removed for effectiveness, less weight, faster return, usability, or other reasons.

The elastomeric material is best to have reasonable tolerance of environmental hazards such as wind, water, ice, chlorine, salt, sunlight, heat, and cold. It should not crack or fade after reasonable use. For ease of manufacturing, the material is easily colored and cut. It can be stable over temperature such that it does not sag or fold on a hot summer day or become hard and brittle on a cold winter day. Other properties such as tear resistance and toughness are also important. Other components may be integrated in the elastomer material to improve its mechanical properties for use. To illustrate, cloth or fiber matrix, e.g. cotton, polyester, or fiberglass, may be formed within an elastomer material of any of the aforementioned base elastomers for improving tear resistance of the fabricated mounting arm. An elastomeric stiffener may be added for stability and faster return after a projectile hit.

FIG. 3 a plan view of the attachment 14 shown in FIG. 1. A strap 20 has a first end 20A threaded through upper slots of attachment 15 and latch 26. The strap 20 further includes a second end 20B threaded through lower slots of attachment 16 and latch 18. A loop 22 is formed by the strap segment formed by the upper and lower threading. A hook 24 is positioned on the loop 22.

FIG. 4A-C illustrates the attachment 15 shown in FIG. 1. In FIG. 4A, the strap 20 is threaded through the mounting arm 12A depicted in FIG. 2B. The strap 20 has a first end 20A threaded to a first slot 16A of the front pair and a first slot 18A of the second pair and a second end 20B threaded through a second slot 16B of the first pair and a second slot 18B of the second pair. A loop 22 is formed from the strap segment positioned between the slots 16A, 16B of the front pair 16. In FIG. 4B, the strap 20 is threaded through the mounting arm 12A depicted in FIG. 2F. The first end 20A and the second end 20B of the strap 20 threaded through the slot 16. The first end 20A is then threaded through the first slot 18A and the second end 20B is then threaded through the second slot 18B. A loop 22 is formed. An optional stop (not shown) may be applied to prevent the loop from being pulled through the mounting arm during use. In FIG. 4C, the strap 20 threaded through the mounting arm 12A depicted in FIG. 2E. The strap 20 has a first end 20A threaded through the first slot 16A and the second end is threaded through the second slot 16B. Both ends 20A, 20B are threaded through slot 18. A loop 22 is formed from the strap segment positioned between the slots 16A, 16B. An optional tensioner 30 is applied across the ends to add tension to strap 20.

While shown in FIG. 4C, the optional tensioner may be applied to any of the disclosed variations. The tensioner may be a second hook 24. One of the strap ends is threaded through the tube of the hook. The hook 24 is positioned over the other strap end. In another variation, a cord having ends threaded through a toggle cord lock may be used. The cord is applied across the strap ends in a cow hitch knot and then the toggle cord lock is positioned. In another variation, both ends are threaded through a ratcheting device. The ratchet provides a variety of settings of additional tension.

The strap is selected from elastic materials, e.g. rubber or low durometer polyurethane, having a Young's modulus range of 0.5-3.5 mPa.

Alternately, the strap 20 may be coated to minimize ultraviolet (UV) cracking, e.g. neoprene coated latex rubber. The strap may be elastomeric tubing or belting.

In operation, the mounting arm is secured by encircling the in situ support and positioning the hook in the hole of the tab. The straps are pulled to apply 10-100 lbs of tension to promote position stability when mounted on the goalpost. The optional tensioner may be used to add more tension to the strap ends.

Figure 5A:
FIGS. 5A and 5B illustrate some cross-sectional views of the hook 24 shown in FIG. 3. In FIG. SA, the hook includes a cylindrical tube.
Figure 5B:

FIGS. 5A and 5B illustrates a cross-sectional view of the hook 24 shown in FIGS. 4A-C. The hook is formed from a sheet of metal, e.g. aluminum or stainless steel. One end of the sheet is bent forming a hook while the distal end is formed into a tube. The tube has comparable dimensions to the strap. In FIG. 5A, the tube is cylindrical for receiving tubing. In FIG. 5B, the tube is oval for receiving belting. The interior of the tube may be beveled to remove sharp edges that might shorten the life expectancy of the strap. Alternatively, the metal may be coated to remove the sharp edges or form a radius.

Figure 6:
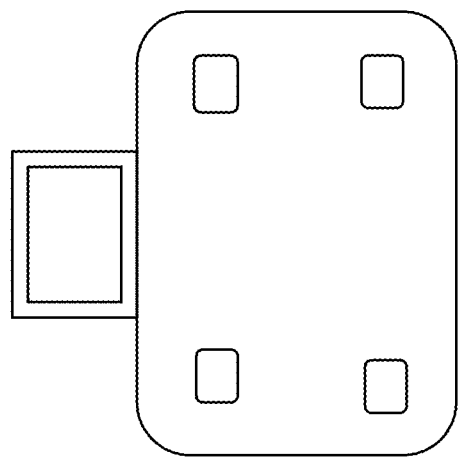
FIG. 6 illustrates the tab of shown in FIG. 3.

FIG. 6 illustrates the tab shown in FIG. 3. The tab 26 includes a hole and two pair of holes. The first pair of holes is positioned proximate the upper edge of the tab while the second pair of holes is positioned proximate the lower edge of the tab. The first end 20A is further threaded through the first pair of holes while the second end 20B is threaded through the second pair of holes. The tab may be made of a strong, tough material, e.g. nylon, polycarbonate, a high density polyethylene (HDPE) sheet, aluminum, or steel. The tab width is comparable to the width of the mounting arm. The holes on the tab and the mounting arm are in alignment for maximum stability and minimal mounting arm deformation.

Figure 7:
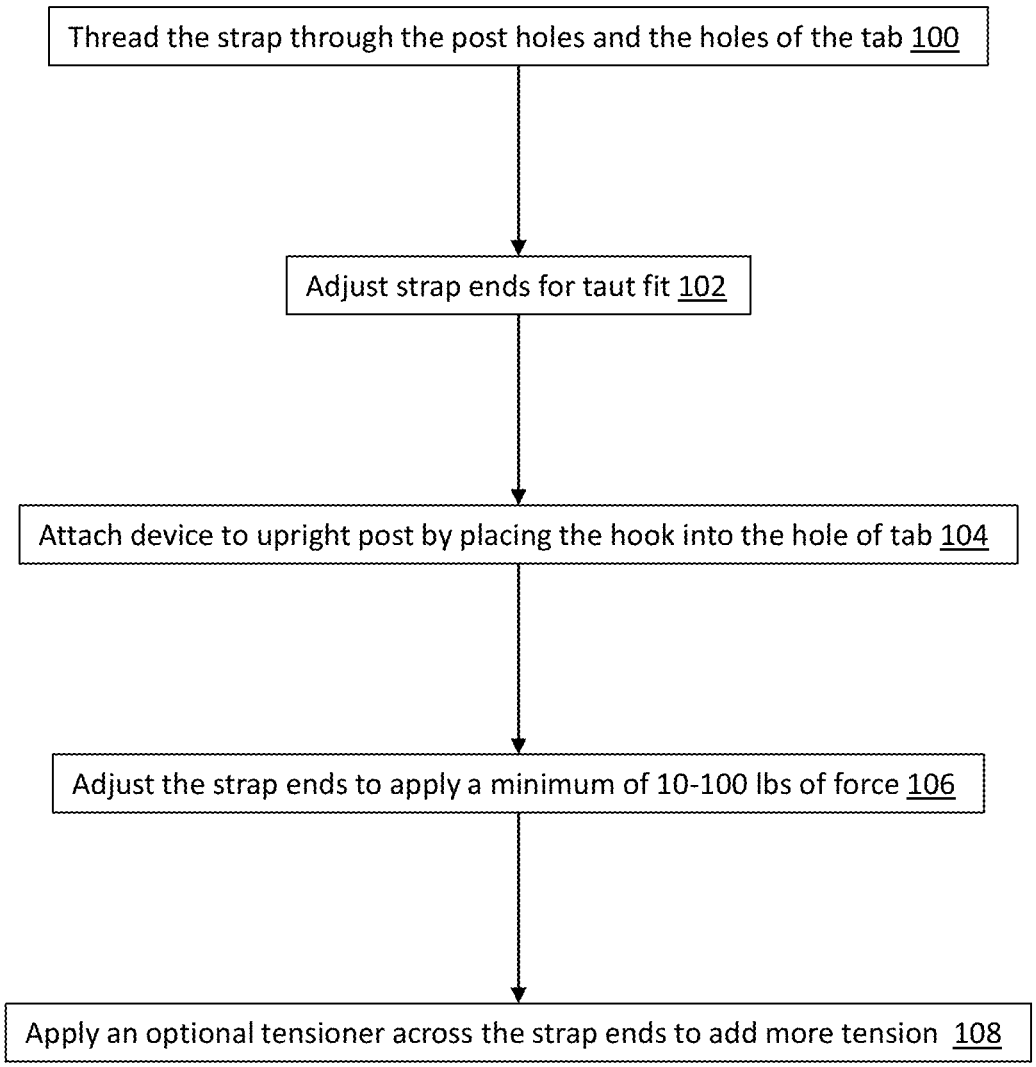
FIG. 7 is a flowchart for securing the attachment of FIG. 2G to a support.

FIG. 7 is a flowchart for securing the attachment of FIG. 2G to a support. In step 100, the strap is threaded the distal holes 18C, 18C for regulation posts or through holes 18A, 18B for smaller posts and then threaded through the holes of tab 26. In step 102, the strap ends are adjusted for a taut fit. In step 104, the sports training device is attached to upright post by placing the hook 24 into the hole of tab 26. In step 106, the strap ends are adjusted to apply 10-100 lbs of force. In step 108, an optional tensioner 30 may be applied across the strap ends to add more tension to the strap.

The mounting arm may be manufactured separately and then combined with a target. To illustrate, a target face may be integrated with the mounting arm portion as one continuous piece, with a mounting surface made separately then stitched or glued or otherwise attached together. In another example, a second reinforcement sheet may be glued or laminated on the mounting arm to improve durability, mechanical stability, and tear resistance.

In another variation, the target face and mounting arm are integrated as one continuous piece with the same or different thickness and/or material properties such as durometer. Any portion of the target face and mounting arm may have one or more additional sheets of elastomeric or other material attached to it by gluing, lamination, stitching, or other methods.

In another variation, a second reinforcement sheet may be glued, laminated, or molded into on the mounting arm to improve stiffness, toughness and tear resistance. Reinforcement may be provided by increasing the durometer of the mounting arm during formation of the sheet. In another variation, the mounting arm may be reinforced by inserting a fiber matrix, foam insert, elastomeric stiffener, e.g. polycarbonate.

Variations of the present invention have been described herein. However, it should be understood that the variations are illustrative examples of the present invention and many possible specific variations can represent applications of the principles of the invention. While certain components are shown and preferred for the attachment, it is foreseeable that functionally equivalent components could be used or subsequently developed to perform the intended functions of the disclosed components.

It is also to be understood that the disclosure is not limited to particular methods or systems, which can, of course, vary. To illustrate, the person skilled in the art will understand that the number of steps or components shown is only indicative and that the method can occur in more or fewer steps and that the system may contain more or less components according to the various embodiments. It is also to be understood that the terminology used herein is for the purpose of describing particular embodiments only, and is not intended to be limiting.

Various modifications pertaining to this present invention by one skilled in the art are deemed within the spirit and scope of this invention as defined in the detailed description and claims. Therefore, while the invention has been described in terms of some variations, it is apparent that other forms could be adopted by one skilled in the art, and the scope of the invention is to be limited only by the following claims.

We claim:

1. A mounting attachment for securing a target to an in situ support comprising:
    a mounting arm including a first and a second pair of slots, the first pair of slots positioned proximate to the target, the second pair of slots positioned at a distal end away from the target;
    a strap including a loop, having a first end threaded to a first slot of the first pair of slots and a first slot of the second pair of slots, having a second end threaded through a second slot of the first pair of slots and a second slot of the second pair of slots;
    a hook positioned on the loop including a distal end tube receiving the strap, and
    a tab that includes a hole, a pair of upper openings and a pair of lower openings,
    wherein the first end threads through the pair of upper openings and the second end thread through the pair of lower openings;
    wherein the mounting is secured by encircling the in situ support and positioning the hook in the hole of the tab.

2. A mounting attachment, as in claim 1, the strap being selected from a group including elastomeric tubing, webbing, and cording.

3. A mounting attachment, as in claim 1, the strap having a Young's modulus range of 0.5-3.5 mPa.

4. A mounting attachment, as in claim 1, the first and second pair of slots being positioned in parallel.

5. A mounting attachment, as in claim 1, further comprising the diameter of the strap being comparable to the width of one of the first and second pair of slots.

6. A mounting attachment, as in claim 1, further comprising the first and the second pair of slots being separated by at least quarter of the circumference of the in situ support.

7. A mounting attachment, as in claim 1, the hook being selected from a group including aluminum and coated stainless steel.

8. A mounting attachment, as in claim 1, further comprising a tensioner positioned across a segment of the first end that is threaded to through first slot of the first pair of slots and the first slot of the second pair of slots and a segment of the second end threaded through the second slot of the first pair of slots and the second slot of the second pair of slots.

* * * * *